(12) United States Patent
Narayana et al.

(10) Patent No.: US 8,619,549 B2
(45) Date of Patent: Dec. 31, 2013

(54) LOCATION BASED LOAD BALANCING OF WIRELESS ACCESS POINTS AND WIRELESS SWITCHES

(75) Inventors: M S Badari Narayana, Santa Clara, CA (US); Kumara Das Karunakaran, San Jose, CA (US); Seemant Choudary, Fremont, CA (US); Veniamin Bourakov, Santa Clara, CA (US)

(73) Assignee: Avaya Inc., Basking Ridge, NJ (US)

( * ) Notice: Subject to any disclaimer, the term of this patent is extended or adjusted under 35 U.S.C. 154(b) by 559 days.

(21) Appl. No.: 12/773,267

(22) Filed: May 4, 2010

(65) Prior Publication Data

US 2010/0290397 A1    Nov. 18, 2010

Related U.S. Application Data

(60) Provisional application No. 61/178,241, filed on May 14, 2009.

(51) Int. Cl.
*H04L 12/26* (2006.01)

(52) U.S. Cl.
USPC ............ 370/217; 370/395.31; 370/401

(58) Field of Classification Search
None
See application file for complete search history.

(56) References Cited

U.S. PATENT DOCUMENTS

| | | | | |
|---|---|---|---|---|
| 2002/0010798 A1* | 1/2002 | Ben-Shaul et al. | | 709/247 |
| 2003/0223408 A1* | 12/2003 | Chen et al. | | 370/352 |
| 2004/0264481 A1* | 12/2004 | Darling et al. | | 370/401 |
| 2007/0248077 A1* | 10/2007 | Mahle et al. | | 370/352 |
| 2008/0031249 A1* | 2/2008 | Valtchev et al. | | 370/392 |
| 2008/0240102 A1* | 10/2008 | Rajsic et al. | | 370/392 |
| 2009/0307255 A1* | 12/2009 | Park | | 707/102 |
| 2010/0043068 A1* | 2/2010 | Varadhan et al. | | 726/15 |

* cited by examiner

*Primary Examiner* — Andrew Chriss
*Assistant Examiner* — Salvador E Rivas
(74) *Attorney, Agent, or Firm* — Anderson Gorecki & Rouille LLP

(57) ABSTRACT

A method, apparatus and computer program product for performing location based load balancing of wireless access points and wireless switches is presented. A wireless controller (WC) receives an associate message from an Access Point (AP)/wireless switch (WS) at the WC. The WC then determines whether a preferred WC for the AP/WS is available. When the preferred WC is not available, then the WC determines if an alternate WC for the AP is available. When the alternate WC is not available, an administrator configured policy may be used that maps the AP to a specific WC. When the policy does exist then the AP is coupled to the WC according to the policy and when the policy does not exist then the WC parses the AP/WS location information for the AP/WS to determine an available geographically closest WC for the AP/WS and sends a message to the AP/WS relating to the available WC. The WC will also assign an available geographically closest WS to AP.

22 Claims, 6 Drawing Sheets

50 →

| Description | Name | Prefix [ X indicates collection type] | | | Size | Table (Collection) |
|---|---|---|---|---|---|---|
| | | C | B | F | | |
| ENTERPRISE – showing 2 CAMPUS LBZs | N-CA-Z | X | | | 3 | BayArea, Petaluma, SacMnto |
| An enterprise has a MD for the state of California. The domain is divided into two LB Zones: North & South | S-CA-Z | X | | | 2 | Irvine, LA |
| ENTERPRISE – Showing 3 BRANCH LBZs | NA-W-BrZ | X | | | 30 | List of branches in Western region |
| An enterprise has 100 branches across NA, which it wants to split into 3 zones. Note that in CBFS hierarchy, a branch is at the level of 'C'. | NA-C-BrZ | X | | | 35 | List of branches in Central region |
| | NA-E-BrZ | X | | | 35 | List of branches in Eastern region |
| CAMPUS – Showing 3 Building LBZs | CAR-Mz1 | CARLING | X | | 2 | CAR-B2, CAR-B3 |
| An enterprise campus (CAR) has 11 buildings of which one is large, 4 are medium – divided into two zones and 6 are small – considered as one zone. Note that there is no need to define zone for the largest bld. | CAR-Mz2 | CARLING | X | | 2 | CAR-B4, CAR-B5 |
| | CAR-Sz | CARLING | X | | 6 | CAR-B6, CAR-B7, CAR-B8, CAR-B9, CAR-B10, CAR-B11 |
| CAMPUS – showing 3 FLOOR LBZa | | | | | | |
| An enterprise campus occupies 10 non-contiguous floors in a skyscraper. These floors are divided into 3 zones. | NY-Uz | NY | WALLST1 | X | 4 | F50,F51,F52,F53 |
| CAMPUS – showing 4 SECTOR level LBZs | | | | | | |
| A mall is built in two levels spread over a large area. | NY_MALL1 | NY_MALL | NY_BLDG | FLR_1 | 4 | F1_1, F1_2, F1_3, F1_4 |
| | NY_MALL2 | NY_MALL | NY_BLDG | FLR_2 | 4 | F2_1, F2_2, F2_3, F2_4 |

*FIGURE 3*

LOCATION BASED LOAD BALANCING OF WIRELESS ACCESS POINTS AND WIRELESS SWITCHES

CROSS REFERENCE TO RELATED APPLICATIONS

The present application claims the benefit of U.S. Provisional Patent Application No. 61/178,241, filed on May 14, 2009, which is incorporated herein by reference in its entirety.

BACKGROUND

Wireless networks have become ubiquitous. A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or layer of the network.

A wireless network consists of several components. These are WCs (Wireless Controllers), WSs (Wireless Switches), APs (Access Points) and MUs (Mobile Units). An MU is a mobile wireless device like a laptop or a VOIP phone set that communicates with other wired or wireless devices over a wireless network. A wireless AP is a device that allows wireless communication devices (MUs) to connect to wireless and wired networks. A WS receives and switches data traffic sent from several MUs via several APs to the enterprise network A WC handles provisioning, configuration, authentication, load balancing and monitoring of WSs, APs and MUs. The WSs, APs and MUs establish secure control channels to WCs for this purpose and exchange control traffic with it. The Wireless Controllers authenticate WSs, APs, MUs and control the coordination between them to provide a seamless mobile network to the end users. In some cases, the WC and WS functions may be integrated in one device. In such cases, the term MS (Mobility Switch) will be used.

The AP acts as a bridge between the MUs on the wireless side and WSs/WCs present on the wired side. The AP performs authentication, authorization, accounting and load balancing of MUs by communicating with the WC. After obtaining authorization by WC, the AP tunnels MU data traffic into the WS assigned by WC for switching.

A WS switches data traffic originated by MUs into both wired and wireless networks. The wireless switches allow mobile units (e.g. MUs like laptops, cell phones etc.) to roam among various locations and still have network access.

A typical wireless network may include a Mobility Domain (MD). The MD includes one or more Access Points (APs), one or more Wireless Switches (WSs), one or more Wireless Controllers (WCs) and one or more Mobile Units (MUs) and is centrally managed for provisioning, configuration and monitoring. A mobility domain is typically a single geographic area where a same set of mobility services is provided. A mobility domain can include tens of WCs, hundreds of WSs, thousands of APs, and tens of thousands of MUs. MUs can include laptops, cell phones, Personal Digital Assistants (PDAs) and the like.

MUs (like Laptops, VOIP phones etc) associate with AP, get authenticated and become a part of MD. As they physically roam, they disconnect from one AP in the MD and get attached to another AP in the MD.

Since an AP or a WS sends control traffic to the WC to which it is associated, associating a large number of these entities to a single WC will heavily load the processing power of the WC. Hence when an AP or WS boots up, it contacts a predetermined WC which load balances and distributes these entities to all the WCs in the MD.

Similarly there is need for distributing wireless data traffic from APs (originated by MUs attached to the APs) evenly across the WSs so that no WS is burdened too heavily. This distribution function is also done by the WC that performs the load balancing.

Traditionally the APs have been load balanced and assigned to WCs either by way of manual configuration or by using a "round robin" or "least loaded WC" methods without using location information.

In cases where WC and WS are deployed as separate devices, there is also need to load balance control channel traffic of both APs and WSs to WCs. In all cases, one designated WC does the load balancing of WSs/APs to WCs, and load balancing of APs to WSs.

SUMMARY

Conventional mechanisms such as those explained above suffer from a variety of deficiencies. One such deficiency associated with addressing load balancing of wireless environments using manual configuration is that this process is tedious, labor intensive, and as the wireless system becomes large, becomes unwieldy. A deficiency associated with simple load balancing using "round robin" or "least loaded WS" methods without using location information is that while this method does distribute the load across WSs, it may also introduce congestion over the network links and cause large latency when the WS is situated far away in the network. It also makes trouble shooting harder.

Embodiments of the invention significantly overcome such deficiencies and provide mechanisms and techniques that provide for a location based load balance of wireless traffic from multiple APs in an enterprise to geographically close WCs/WSs. Location attributes of the type Campus-Building-Floor-Sector (C-B-F-S) are configured for each AP and WS. When an AP initializes, it contacts a WC and provides its unique identification information (a serial number or MAC address). The WC uses this identification to lookup the configuration database to retrieve the location information of the connecting AP. Alternately an AP that has already been configured with the location information, may supply it when contacting the WC. The WC is aware of the load on each of the other WCs and WSs in the enterprise. The WC then applies the load balancing policy configured by the administrator and selects the WC that is geographically closest to the AP and is least loaded. The AP then associates to that selected WC, and becomes a part of the wireless network.

The presently disclosed invention solves the problem of improper wireless traffic distribution in an enterprise network that may cause overload on some wireless controllers (WCs) while some others are lightly loaded. It also does this load balancing intelligently by using the location information of APs, WCs and WSs so that traffic from APs is sent to geographically nearby WCs and WSs. This reduces packet latency, eliminates unnecessary traffic on enterprise network segments and also facilitates troubleshooting as the traffic is contained within the local WCs, WSs and APs. It also reduces programming of firewalls that are encountered when the traffic spans many segments of an enterprise network.

In a particular embodiment of a method for performing location-based load balancing of wireless access points and wireless switches, the method includes receiving an Associate message from a First Network Device (FND) type at a Second Network Device (SND) type. In one embodiment the FND comprises an AP or WS and the SND comprises a wireless controller (WC) The method further includes determining a preferred SND for the FND is not available and also includes determining an alternate SND for the FND is not available. Additionally the method includes determining if an administrator configured policy that maps the FND to a specific SND exists and when the policy does exist then coupling the FND to the SND according to the policy and when the policy does not exist then parsing the FND location information to determine a SND for the FND that is in a same zone or is geographically closest to the FND. The method also includes sending a message to the FND relating to the available SND.

Other embodiments include a computer readable medium having computer readable code thereon for performing location based load balancing of wireless access points and wireless switches. The computer readable medium includes instructions for receiving an Associate message from a First Network Device (FND) type at a Second Network Device (SND) type. In one embodiment the FND comprises an AP or WS and the SND comprises a wireless controller (WC). The computer readable medium further includes instructions for determining a preferred SND for the FND is not available and also includes determining an alternate SND for the FND is not available. Additionally the computer readable medium includes instructions for determining if an administrator configured policy that maps the FND to a specific SND exists and when the policy does exist then coupling the FND to the SND according to the policy and when the policy does not exist then parsing the FND location information to determine a SND for the FND that is in a same zone or is geographically closest to the FND. The computer readable medium also includes instructions for sending a message to the FND relating to the available SND.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides location based load balancing of wireless access points and wireless switches as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing location based load balancing of wireless access points and wireless switches as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 depicts an example load balancing data model;

DETAILED DESCRIPTION

Figure 1:
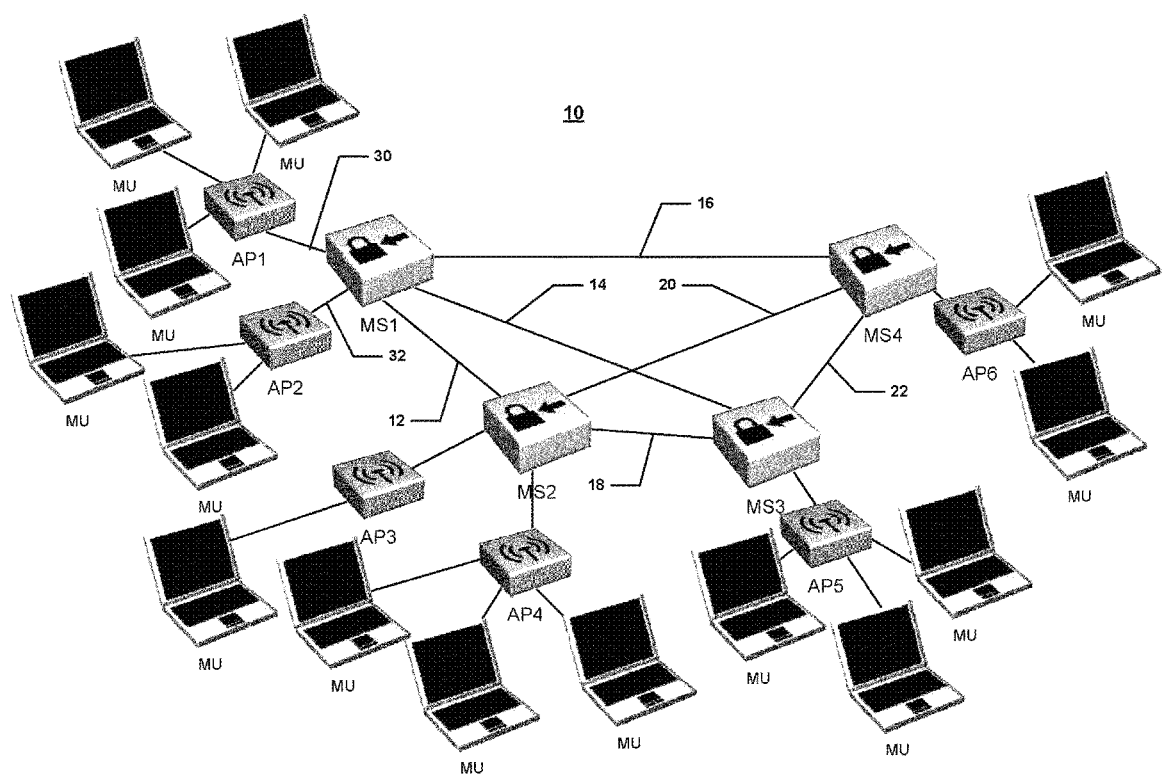
FIG. 1 depicts a block diagram view of an example mobility domain.

Referring to FIG. 1, a Mobility Domain (MD) 10 comprising a campus is shown. In the description below, a wireless switch (WS) coupled with a wireless controller (WC) integrated into a single device is referred as Mobility Switch (MS). In this example, the MD 10 includes four mobility switches MS1, MS2, MS3 and MS4, though it should be recognized that typical environments can include hundreds of MSs. The MSs are interconnected in a mesh arrangement by a plurality of mobility tunnels that facilitate switching of wireless data across the data network. Mobility tunnel 12 is provided between MS1 and MS2, mobility tunnel 14 is provided between MS1 and MS3 and mobility tunnel 16 is provided between MS1 and MS4. Mobility tunnel 18 is provided between MS2 and MS3, mobility tunnel 20 is provided between MS2 and MS4 and mobility tunnel 22 is provided between MS3 and MS4.

Mobility domain 10 also includes six APs. An access tunnel is provided between a respective AP and an MS. Access tunnel 30 is provided between AP1 and MS1 and access tunnel 32 is provided between AP2 and MS1. Access tunnel 34 is provided between AP3 and MS2 and access tunnel 36 is provided between AP4 and MS2. Access tunnel 38 is provided between AP5 and MS3 and access tunnel 40 is provided between AP6 and MS4.

Also shown is a plurality of mobile Units (MUs). Examples of MUs include laptop computers, cellular telephones, Personal Digital Assistants (PDAs) and the like. The MD architecture supports roaming of Mobile Units across Mobility Switches. The MUs retain their IP Address in both intra-subnet and inter-subnet roaming scenarios.

When a Mobile Unit associates to an Access Point, using an Associate message, the Access Point will talk directly to the wireless controller to authenticate this particular client. A specific protocol is used to authenticate the client and at the same time establish his authorizations.

In this example, MS1 and MS2, as well as their respective APs and MUs are part of building 1, while MS3, MS4 and their respective APs and MUs are located in Building 2. Within the building 1 group, MS1 and its associated APs and MUs are located on the first floor (floor 1) while MS2 and its respective APs and MUs reside on floor 2. Within the floor 1 grouping, AP1 and its associated MUs make up sector 1 while AP2 and its associated MUs make up sector 2.

When an AP boots up, it contacts a MS and provides its identity and location information. Alternately the MS can be pre-configured with AP's location by an offline utility. The MS maps the AP's location information to a Load Balancing Zone (LBZone) by using Longest-Prefix Match (LPM) algorithm. The MS then applies the load balancing policy rules and assigns a new (possibly) MS to the AP. The MS redirects the AP to contact the newly assigned MS. The load balancing methodology is simple, predictable, flexible, and scalable. By default, the AP associates with the least loaded MS that is located close to the AP. However offline planning tools can be used to statically configure APs association to a specific MS. The methodology is scalable from small to large enterprises. The load balancing methodology is primarily used to distribute APs evenly across MSs.

The load balancing strategy is to use the location as the basis for performing the balancing. Deployed locations are configured for AP, and MS) The location format is (C-B-F-S) Campus, Building, Floor, and Sector. Sectors are non-overlapping and are optional. Locations are contained within a Mobility Domain. The location and association preferences for the APs are configured and is populated into a Domain AP Table. Locations are also configured for MSs.

Domain AP Table Configuration Fields for device locations include the following:

Campus: The campus where the AP/MS is located.

Building: The building in the above campus where the AP/MS is located;

Floor: The floor in the above building where the AP/MS is located.

Sector: The sector within the above floor where the AP/MS is located. This level of hierarchy is required only for very large floors (e.g. stadiums, airports, malls)

An 8-character string is used to identify each field, and an empty string indicates the field is not configured.

A Preferred MS, if configured, will manage the AP provided it is UP and has enough capacity. An Alternate MS, if configured, is the MS that will manage the AP when the preferred MS is DOWN or has reached its maximum capacity. An administrator configured policy may be used that maps the AP to a specific MS. When the policy does exist then the AP is coupled to the MS according to the policy and when the policy does not exist then the AP location information is parsed to determine a MS for the AP that is in a same zone or is geographically closest to the AP.

A Load Balancing Zone (LB Zone) is a physical space in the Mobility Domain where the devices (APs & MSs) located in that space are expected to work with each other. It is a subset of the physical space spanned by the CBFS hierarchy. Some default Zones are implicitly defined by the nodes in the CBFS hierarchy. Every Campus, Building, Floor and Sector defines a default Load Balancing Zone. These zones are hierarchical and can be searched using Longest-Prefix Match (LPM) to locate the physically nearest MS to a particular AP. By default, MS attempts to assign an AP to a MS within the AP's default LB-Zone(s) first. Similarly a MS is assigned to a WC in the WS's default LB Zone(s). Custom Zones can be defined by clubbing together default zones within a single hierarchy level.

Figure 2:
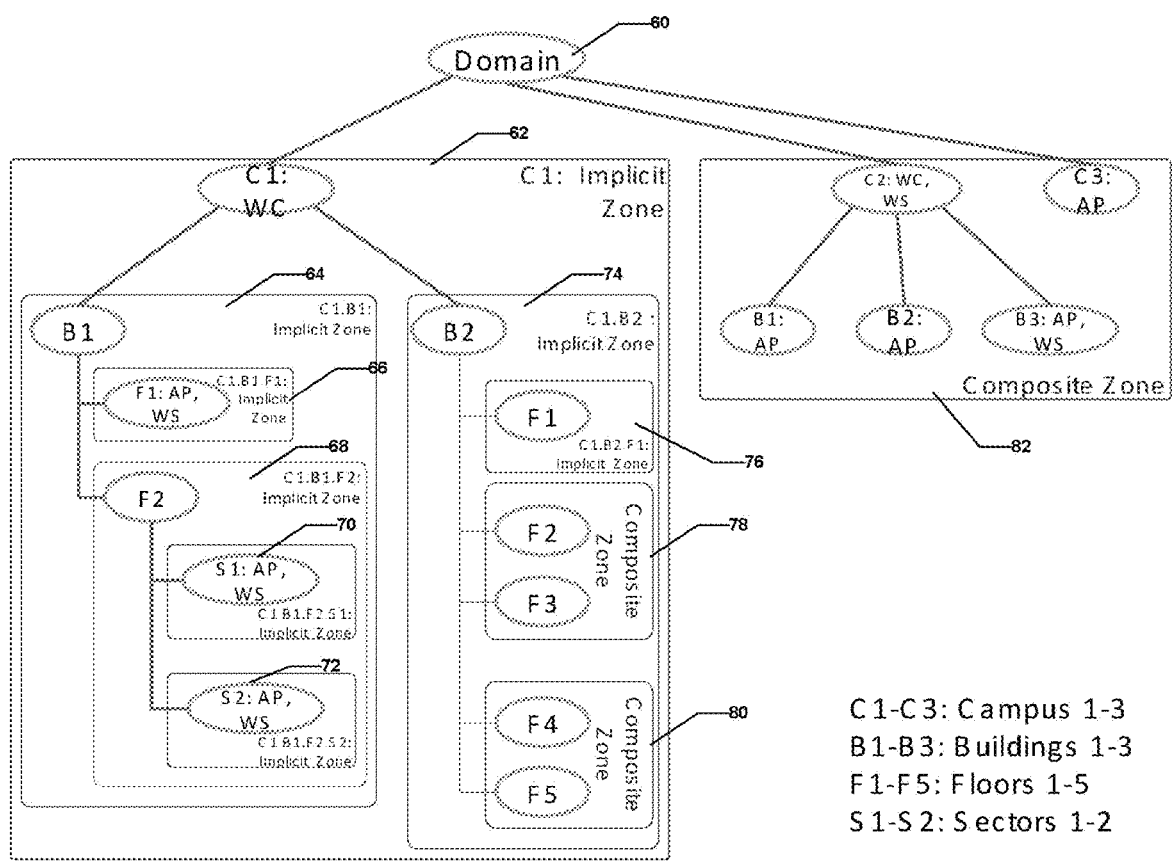
FIG. 2 shows an example Mobility Domain including multiple implicit zones and composite zones.

FIG. 2, shows a mobility domain 60 where the WC and WS functions of an MS are split into separate devices. The mobility domain is shown containing both implicit zones and composite zones. Associated with each WS, WC and AP is their location information in the form C-B-F-S (Campus, Building, Floor and Sector). The CBFS location information specifies the physical region where these WS, WC and AP are located. Thus the location information can locate an entity like an AP in a small physical region when all of CBFS attributes are specified or it can locate the entity in a large physical region when only CBF or CB or C attributes are specified. The physical region specified by the location attributes for an wireless network entity is also referred as it's zone. Thus AP/WS/WC have their corresponding AP zone/WS zone/WC zones.

Generically any physical region specified by a single location specification like CBFS or CBF or CB or C is referred as the "implicit zone". Therefore the physical region specified by the location specification for AP/WC/WS (i.e., AP zone/WS zone/WC zone) are all implicit zones.

Location based load balancing is a feature that load balances the APs/WSs to the WCs all contained with in a physical region. Such a physical region used for location based load balancing is known as the load balance zone (LB Zone). All implicit zones are considered as default LB zones and require no explicit configuration. However, a physical region for a LB zone can also be specified as a combination of implicit locations at the same hierarchy level and is referred to it as a composite LB zone. This allows multiple sectors or multiple floors or multiple buildings or multiple campuses to be grouped and treated as a single zone. Thus the set C1-B1-F1-S1 and C1-B1-F1-S2 defines a composite LB zone that is a combination of two sectors in a single floor C1-B1-F1. These composite LB zones require explicit configuration (unlike the default LB zones).

Domain 60 includes first implicit zone 62 (labeled C1) for a first campus. Within implicit zone 62 are other implicit zones, namely implicit zone 64 (labeled C1.B1) and implicit zone 74 (labeled C1.B2). Within implicit zone 64 is another implicit zone 68, labeled C1.B1.F2. Within implicit zone 68 are other implicit zones, namely implicit zone 70 (labeled C1.B1.F2.S1) and implicit zone 72 (labeled C1.B1.F2.S2). Within implicit zone 74 are one other implicit zone, namely implicit zone 76 (labeled C1.B2.F1) and composite zones 78 and 80. Also shown is another composite zone 82. As can be seen from this diagram, an implicit zone involves a single campus, a single building, a single floor or a single sector. In contrast to an implicit zone, a composite zone involves multiple campuses, multiple buildings, multiple floors or multiple sectors.

Referring now to FIG. 3, an LB Zone Data Model Table 50 is shown containing the following fields:
  Name [8 char]: Name of the LB Zone
  Location Prefix: a scalar defining C-B-F prefix
  Campus [8 char]: Name of the Campus
  Building [8 char]: Name of the Building
  Floor [8 char]: Name of the floor
  Empty string means prefix stops at that level
  Table Size [Int]: Number of entries in the table
  Table of object names of at hierarchy level of the prefix
  Hierarchical location information of the type Campus-Building-Floor-Sector (CBFS) is configured for each WS and AP. Each prefix (leading part of C-B-F-S) defines a geographical area. Thus ["NY Campus, Building_5"] defines an area encompassing the entire "Building_5" in the "NY Campus". A collection of one or more prefixes defines a geographic area called the "Load Balancing Zone" (LBZ). A load balancing metric defines the rules for assigning APs to WCs/WSs within in the LBZ. Typically used metrics are, "Least Load", "Least Weighted Load" and "Round Robin".

An AP Load Balancing procedure works as described below. The following methods are sequentially tried to assign WC/WS to an AP. First, the Preferred WC/WS is assigned if it is configured, is UP, and has capacity. Next the Alternate WC/WS is assigned if it is configured, is UP, and has capacity. An administrator configured policy may be used that maps the AP to a specific WC/WS. When the policy does exist then the AP is coupled to the WC according to the policy and when the policy does not exist then the AP location information is parsed to determine a WC/WS for the AP that is in a same zone or is geographically closest to the AP.

If location CBFS is configured for AP, the WC/WS is assigned from the set of WC/WS located below the leaf node. If this fails, we go up the hierarchy and choose from the set of WC/MS located below the higher node. We keep moving up the hierarchy until a suitable WC/WS is found. If location CBFS is NOT configured for the AP, then the set of WC/WS in the entire Mobility Domain is searched and a suitable WS/WS is assigned to the AP.

For locating candidate WC/WS within the CBFS hierarchy, the AP prefix values CBFS/CBF/CB/C (longest-prefix first) are used in sequence to navigate up the tree and to select all WC/WS that match the AP prefix. From the set of candidate WC/WS, one that is currently UP, has not reached the maximum configured capacity that meets the LB metric criteria is selected and assigned. The supported metrics include least load, round robin, weighted least load (to account for the varying number of radios for an AP).

When an AP associates to an assigned WC that is not the Preferred/Alternate WC (due to they being not active), it can be reset and made to re-associate to the Preferred/Alternate WC when they become active.

Previous paragraphs specified how control traffic originated by APs/WSs were load balanced to WCs in the MD. In a similar manner, data traffic from APs (originated by MUs) is load balanced by assigning APs to WSs. The location based load balancing of APs to WSs follows the same procedure as the one used to assign WCs to APs/WSs.

Figure 4:
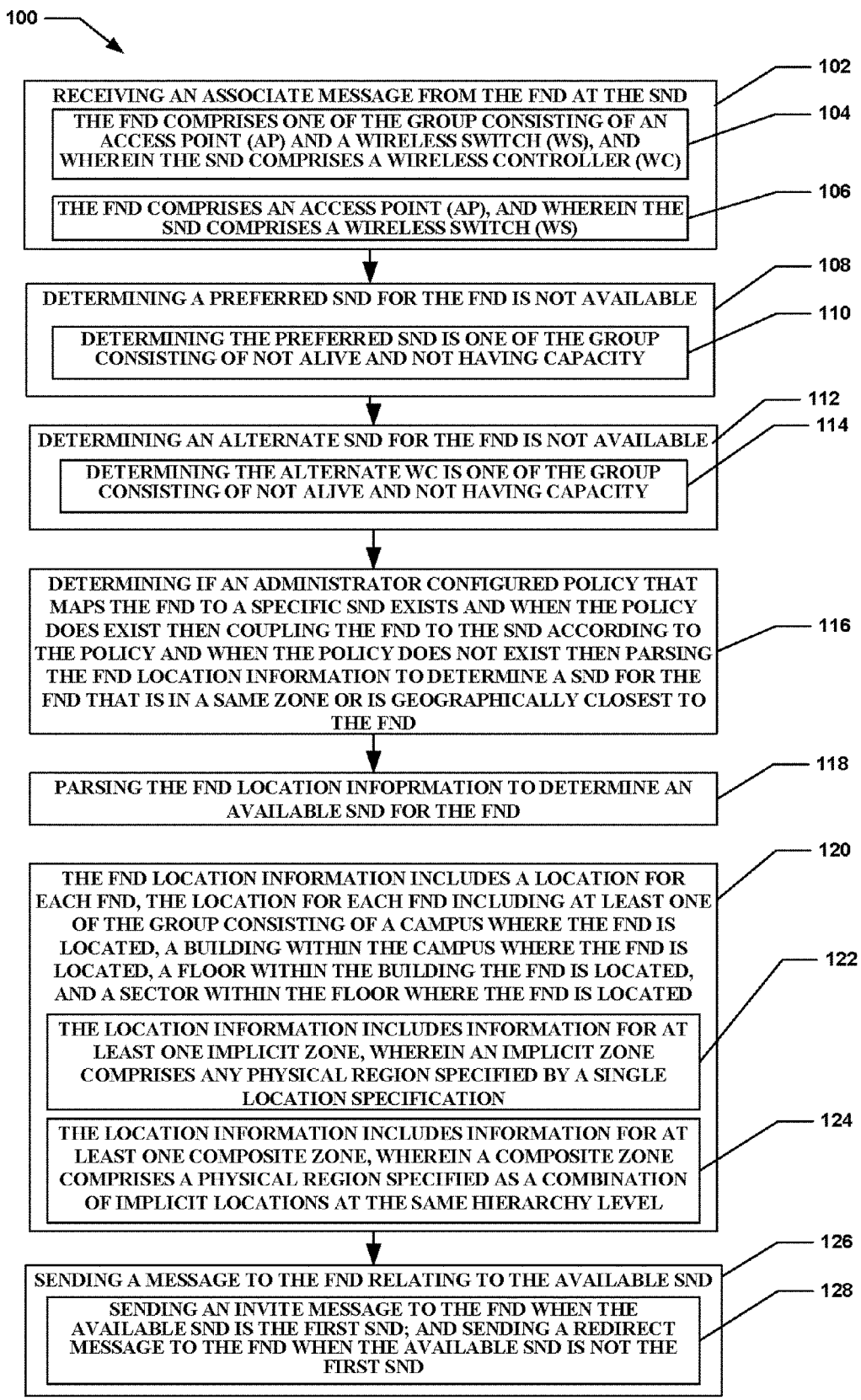
FIG. 4 depicts a flow diagram of a particular method of performing location-based load balancing of wireless access points and wireless switches in accordance with embodiments of the invention.
Figure 5:
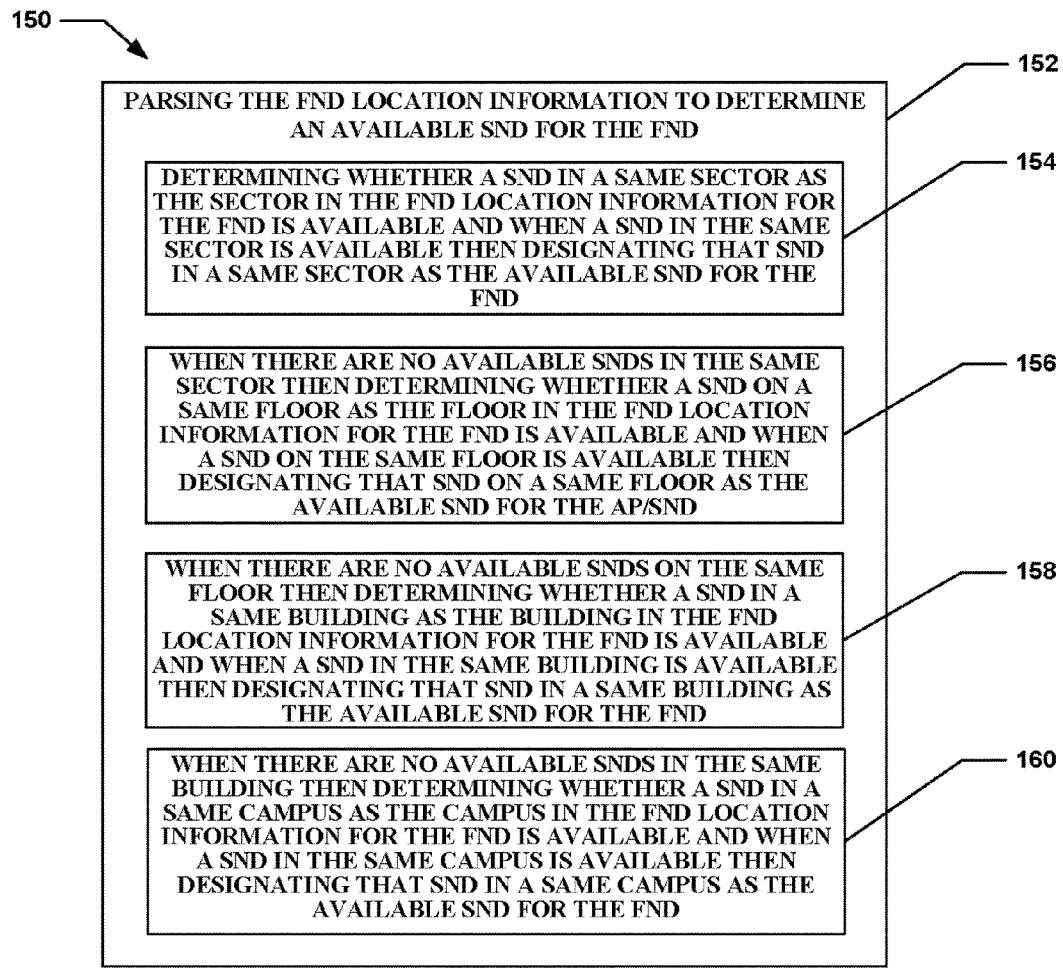
FIG. 5 depicts a flow diagram of a method for parsing an AP location information in accordance with embodiments of the invention.

A flow chart of particular embodiments of the presently disclosed methods are depicted in FIG. 4 and FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information that one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method for providing load balancing is shown. Method 100 starts with processing block 102 which discloses receiving an Associate message from a First Network Device (FND) type at a Second Network Device (SND) type. As shown in processing block 104 in one embodiment the FND comprises one of the groups consisting of an Access Point (AP) and a Wireless Switch (WS), and the SND comprises a Wireless Controller (WC). As shown in processing block 106, in another embodiment the FND comprises an Access Point (AP), and the SND comprises a Wireless Switch (WS). An FND has either rebooted, powered up, or become available and now seeks to associate with a SND.

Processing block 108 states determining a preferred SND for the FND is not available. As shown in processing block 110, determining a preferred SND for the FND is not available comprises determining the preferred SND is one of the group consisting of not alive and not having capacity.

Processing block 112 recites determining an alternate SND for the FND is not available. As shown in processing block 114, determining an alternate SND for the FND is not available comprises determining the alternate SND is one of the group consisting of not alive and not having capacity.

Processing block 116 states determining if an administrator configured policy that maps the FND to a specific SND exists and when the policy does exist then coupling the FND to the SND according to the policy and when the policy does not exist then parsing the FND location information to determine a SND for said FND that is in a same zone or is geographically closest to the FND.

Processing block 118 discloses parsing the FND location information for the FND to determine an available SND for the FND. The parsing step is described in detail in the description of the flow diagram shown in FIG. 4 below.

Processing continues with processing block 120 which recites the FND location information includes a location for each FND, the location for each FND including at least one of the group consisting of a campus where the FND is located, a building within the campus where the FND is located, a floor within the building the FND is located, and a sector within the floor where the FND is located.

Processing block 122 discloses the location information includes information for at least one implicit zone, wherein an implicit zone comprises any physical region specified by a single location specification. Processing block 124 states said location information includes information for at least one composite zone, wherein a composite zone comprises a physical region specified as a combination of implicit locations at the same hierarchy level.

Processing block 126 states sending a message to the AP relating to the available WC. As shown in processing block 128, the sending a message to the AP relating to the available WC comprises sending an INVITE message to the AP when the available WC is the first WC; and sending a REDIRECT message to the AP when the available WC is not the first WC.

Referring now to FIG. 5, a particular embodiment of the method 150 used to parse the AP location information to determine an available WC for the AP is shown. Method 150 begins with processing block 152 which recites parsing the FND location information to determine an available SND for the FND.

Processing block 154 discloses determining whether a SND in a same sector as the sector in the FND location information for the FND is available and when a SND in the same sector is available then designating that SND in the same sector as the available SND for the FND.

Processing block 156 states when there are no available SNDs in the same sector then determining whether a SND on a same floor as the floor in the FND location information for the FND is available and when a SND on the same floor is available then designating that SND on a same floor as the available SND for the FND.

Processing block 158 recites when there are no available SNDs on the same floor then determining whether a SND in a same building as the building in the FND location information for the FND is available and when a SND in the same building is available then designating that SND in a same building as the available SND for the FND.

Processing block 160 discloses when there are no available SNDs in the same building then determining whether a SND in a same campus as the campus in the FND location information for the FND is available and when a SND in the same campus is available then designating that SND in a same campus as the available SND for the FND.

Figure 6:
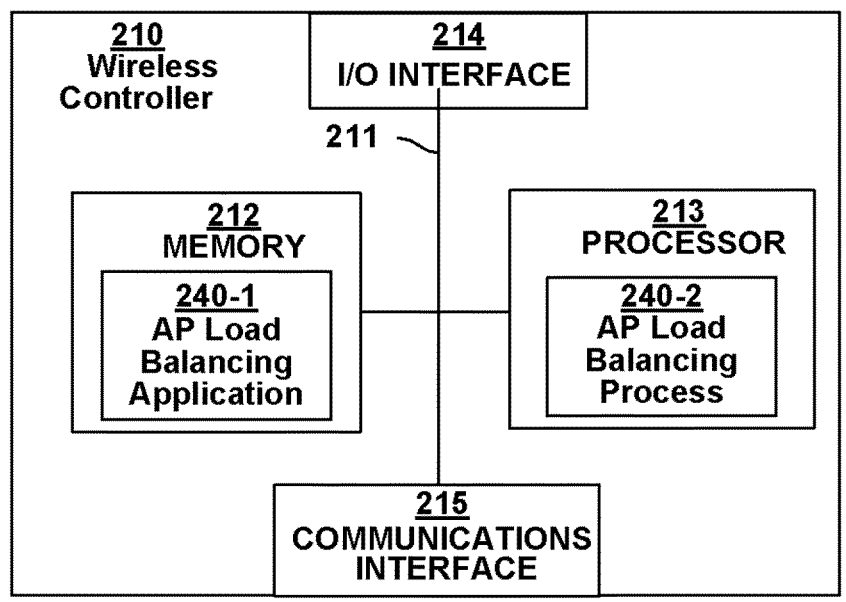
FIG. 6 illustrates an example computer system architecture for a computer system that performs location-based load balancing of wireless access points and wireless switches in accordance with embodiments of the invention.

FIG. 6 is a block diagram illustrating example architecture of a wireless switch 210 that executes, runs, interprets, operates or otherwise performs a AP load balancing application 240-1 and AP load balancing process 240-2 suitable for use in explaining example configurations disclosed herein. The wireless switch 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the AP load balancing application 240-1 and process 240-2 provides on the display 230. As shown in this example, the wireless switch 210 includes an interconnection mechanism 211 such as a data bus or other circuitry that couples a memory system 212, a processor 213, an input/output interface 214, and a communications interface 215. The communications interface 215 enables the wireless switch 210 to communicate with other devices (i.e., other computers) on a network (not shown).

The memory system 212 is any type of computer readable medium, and in this example, is encoded with an AP load balancing application 240-1 as explained herein. The AP load balancing application 240-1 may be embodied as software code such as data and/or logic instructions (e.g., code stored in the memory or on another computer readable medium such as a removable disk) that supports processing functionality according to different embodiments described herein. During operation of the wireless switch 210, the processor 213 accesses the memory system 212 via the interconnect 211 in order to launch, run, execute, interpret or otherwise perform the logic instructions of a AP load balancing application 240-1. Execution of a AP load balancing application 240-1 in this manner produces processing functionality in the AP load balancing process 240-2. In other words, the AP load balancing process 240-2 represents one or more portions or runtime instances of a AP load balancing application 240-1 (or the entire a AP load balancing application 240-1) performing or executing within or upon the processor 213 in the computerized device 210 at runtime.

It is noted that example configurations disclosed herein include the AP load balancing application 240-1 itself (i.e., in the form of un-executed or non-performing logic instructions and/or data). The AP load balancing application 240-1 may be stored on a computer readable medium (such as a floppy disk), hard disk, electronic, magnetic, optical, or other computer readable medium. A AP load balancing application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a AP load balancing application 240-1 in the processor 213 as the AP load balancing process 240-2. Those skilled in the art will understand that the wireless switch 210 may include other processes and/or software and hardware components, such as an operating system not shown in this example.

During operation, processor 213 of wireless switch 200 accesses memory system 212 via the interconnect 211 in order to launch, run, execute, interpret or otherwise perform the logic instructions of the AP load balancing application 240-1. Execution of AP load balancing application 240-1 produces processing functionality in AP load balancing process 240-2. In other words, the AP load balancing process 240-2 represents one or more portions of the AP load balancing application 240-1 (or the entire application) performing within or upon the processor 213 in the wireless switch 200.

It should be noted that, in addition to the AP load balancing process 240-2, embodiments herein include the AP load balancing application 240-1 itself (i.e., the un-executed or non-performing logic instructions and/or data). The AP load balancing application 240-1 can be stored on a computer readable medium such as a floppy disk, hard disk, or optical medium. The AP load balancing application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of AP load balancing application 240-1 in processor 213 as the AP load balancing process 240-2. Those skilled in the art will understand that the wireless switch 200 can include other processes and/or software and hardware components, such as an operating system that controls allocation and use of hardware resources associated with the wireless switch 200.

The above described method and apparatus for providing load balancing provides several advantages over conventional methods. Since control traffic from APs/WSs has to reach WCs, keeping it geographically near eliminates unnecessary traffic on several network segments that would need to be traversed in order to reach WCs which are farther away. Since all the data traffic from APs has to reach WSs, keeping it geographically near eliminates unnecessary traffic on several network segments that would need to be traversed in order to reach WSs which are farther away. This is a more acute problem as data traffic is much higher than control traffic. Further, the present method avoids programming of firewalls, in the path to reach the distant WC/WS, to let the wireless control and data traffic pass through. The method also reduces the latency of traffic by reducing the number of hops and also reduces congestion on shared network links as well as reducing the complexity in trouble shooting problems related to wireless traffic in the network.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a first network device (FND) type is coupled to a second network device (SND) type comprising:
   receiving an Associate message from said FND at said SND;
   determining a preferred SND for said FND is not available;
      determining an alternate SND for said FND is not available;
      determining if an administrator configured policy that maps said FND to a specific SND exists and when said policy does exist then coupling said FND to said specific SND according to said policy and when said policy does not exist then parsing said FND location information to determine an available SND for said FND that is in a same zone or is geographically closest to said FND; and
      sending a message to said FND relating to said available SND.

2. The method of claim 1 wherein said FND comprises one of the group consisting of an Access Point (AP) and a Wireless Switch (WS), and wherein one of said preferred SND, alternate SND, specific SND and available SND comprises a Wireless Controller (WC).

3. The method of claim 1 wherein said FND comprises an Access Point (AP), and one of said preferred SND, alternate SND, specific SND and available SND for coupling comprises a Wireless Switch (WS).

4. The method of claim 1 wherein said determining a preferred SND for said FND is not available comprises determining said preferred SND is one of the group consisting of not alive and not having capacity and wherein said determining an alternate SND for said FND is not available comprises determining said alternate SND is one of the group consisting of not alive and not having capacity.

5. The method of claim 1 wherein said FND location information includes a location for each FND, said location for each FND including at least one of the group consisting of a campus where said FND is located, a building within said campus where said FND is located, a floor within said building said FND is located, and a sector within said floor where said FND is located.

6. The method of claim 5 wherein said parsing said FND location information for said FND to determine an available SND for said FND comprises:
determining whether a SND in a same sector as said sector in said FND location information for said FND is available and when a SND in said same sector is available then designating that SND in a same sector as said available SND for said FND;
when there are no available SNDs in said same sector then determining whether a SND on a same floor as said floor in said FND location information for said FND is available and when a SND on said same floor is available then designating that SND on a same floor as said available SND for said FND;
when there are no available SNDs on said same floor then determining whether a SND in a same building as said building in said FND location information for said FND is available and when a SND in said same building is available then designating that SND in a same building as said available SND for said FND; and
when there are no available SNDs in said same building then determining whether a SND in a same campus as said campus in said FND location information for said FND is available and when a SND in said same campus is available then designating that SND in a same campus as said available SND for said FND.

7. The method of claim 1 wherein said sending a message to said FND relating to said available SND comprises sending an INVITE message to the FND when the available SND is the first SND; and sending a REDIRECT message to the FND when the available SND is not the first SND.

8. The method of claim 5 wherein said location information includes information for at least one implicit zone, wherein an implicit zone comprises any physical region specified by a single location specification.

9. The method of claim 5 wherein said location information includes information for at least one composite zone, wherein a composite zone comprises a physical region specified as a combination of implicit locations at the same hierarchy level.

10. A wireless device comprising:
a memory;
a processor;
a communications interface;
an interconnection mechanism coupling the memory, the processor and the communications interface; and
wherein the memory is encoded with an application providing load balancing, that when performed on the processor, provides a process for processing information, the process causing the wireless device to perform the operations of:
receiving an Associate message from a first network device (FND) type at a second network device (SND) type;
determining a preferred SND for said FND is not available;
determining an alternate SND for said FND is not available;
determining if an administrator configured policy that maps said FND to a specific SND exists and when said policy does exist then coupling said FND to said specific SND according to said policy and when said policy does not exist then parsing said FND location information to determine an available SND for said FND that is in a same zone or is geographically closest to said FND; and
sending a message to said FND relating to said available SND.

11. The wireless device of claim 10 wherein said FND comprises one of the group consisting of an Access Point (AP) and a Wireless Switch (WS), and wherein one of said preferred SND, alternate SND, specific SND and available SND comprises a Wireless Controller (WC).

12. The wireless device of claim 10 wherein said FND comprises an Access Point (AP), and one of said preferred SND, alternate SND, specific SND and available SND for coupling comprises a Wireless Switch (WS).

13. The wireless device of claim 10 wherein said determining a preferred SND for said FND is not available comprises determining said preferred SND is one of the group consisting of not alive and not having capacity and wherein said determining an alternate SND for said FND is not available comprises determining said alternate SND is one of the group consisting of not alive and not having capacity.

14. The wireless device of claim 10 wherein said FND location information includes a location for each FND, said location for each FND including at least one of the group consisting of a campus where said FND is located, a building within said campus where said FND is located, a floor within said building said FND is located, and a sector within said floor where said FND is located.

15. The wireless device of claim 14 wherein said parsing said FND location information for said FND to determine an available SND for said FND comprises:
determining whether a SND in a same sector as said sector in said FND location information for said FND is available and when a SND in said same sector is available then designating that SND in a same sector as said available SND for said FND;
when there are no available SNDs in said same sector then determining whether a SND on a same floor as said floor in said FND location information for said FND is available and when a SND on said same floor is available then designating that SND on a same floor as said available SND for said FND;
when there are no available SNDs on said same floor then determining whether a SND in a same building as said building in said FND location information for said FND is available and when a SND in said same building is available then designating that SND in a same building as said available SND for said FND; and
when there are no available SNDs in said same building then determining whether a SND in a same campus as said campus in said FND location information for said FND is available and when a SND in said same campus is available then designating that SND in a same campus as said available SND for said FND.

16. The wireless device of claim 10 wherein said sending a message to said FND relating to said available SND comprises sending an INVITE message to the FND when the available SND is the first SND; and sending a REDIRECT message to the FND when the available SND is not the first SND.

17. The wireless device of claim 14 wherein said location information includes information for at least one implicit zone, wherein an implicit zone comprises any physical region specified by a single location specification.

18. The wireless device of claim 14 wherein said location information includes information for at least one composite zone, wherein a composite zone comprises a physical region specified as a combination of implicit locations at the same hierarchy level.

19. The set of eligible wireless SND devices of claim 15 that can be coupled to a FND device belongs to the same implicit or composite zone of the FND device.

20. A non-transitory computer readable storage medium having computer readable code thereon for providing Access Point (AP) load balancing, the medium including instructions in which a Wireless Device performs operations comprising:
  receiving an Associate message from a first network device (FND) type at a second network device (SND) type;
  determining a preferred SND for said FND is not available;
    determining an alternate SND for said FND is not available;
    determining if an administrator configures policy that maps said FND to a specific SND exists and when said policy does exist then coupling said FND to said specific SND according to said policy and when said policy does not exist then parsing said FND location information to determine an available SND for said FND that is in a same zone or is geographically closest to said FND; and
  sending a message to said FND relating to said available SND.

21. The non-transitory computer readable storage medium of claim 20 wherein said parsing said FND location information for said FND to determine an available SND for said FND comprises:
  determining whether a SND in a same sector as said sector in said FND location information for said FND is available and when a SND in said same sector is available then designating that SND in a same sector as said available SND for said FND;
  when there are no available SNDs in said same sector then determining whether a SND on a same floor as said floor in said FND location information for said FND is available and when a SND on said same floor is available then designating that SND on a same floor as said available SND for said AP/SND;
  when there are no available SNDs on said same floor then determining whether a SND in a same building as said building in said FND location information for said FND is available and when a SND in said same building is available then designating that SND in a same building as said available SND for said FND; and
  when there are no available SNDs in said same building then determining whether a SND in a same campus as said campus in said FND location information for said FND is available and when a SND in said same campus is available then designating that SND in a same campus as said available SND for said FND.

22. A wireless device (WD) comprising:
  a memory;
  a processor;
  a communications interface;
  an interconnection mechanism coupling the memory, the processor and the communications interface; and
  wherein the memory is encoded with an application providing load balancing, that when performed on the processor, provides a process for processing information, the process causing the computer system to perform the operations of:
  receiving an Associate message from a first network device (FND) type at said WD;
determining a preferred WD for said FND is not available;
  determining an alternate WD for said FND is not available;
  determining if an administrator configured policy that maps said FND to a specific WD exists and when said policy does exist then coupling said FND to said specific WD according to said policy and when said policy does not exist then parsing said WD location information to determine a WD for said available FND that is in a same zone or is geographically closest to said FND; and
  sending a message to said FND relating to said available WD.

* * * * *